Jan. 5, 1965 H. W. STIER 3,163,920
MILLING CUTTER WITH THROWAWAY CUTTING INSERTS
Filed March 18, 1964 2 Sheets-Sheet 1
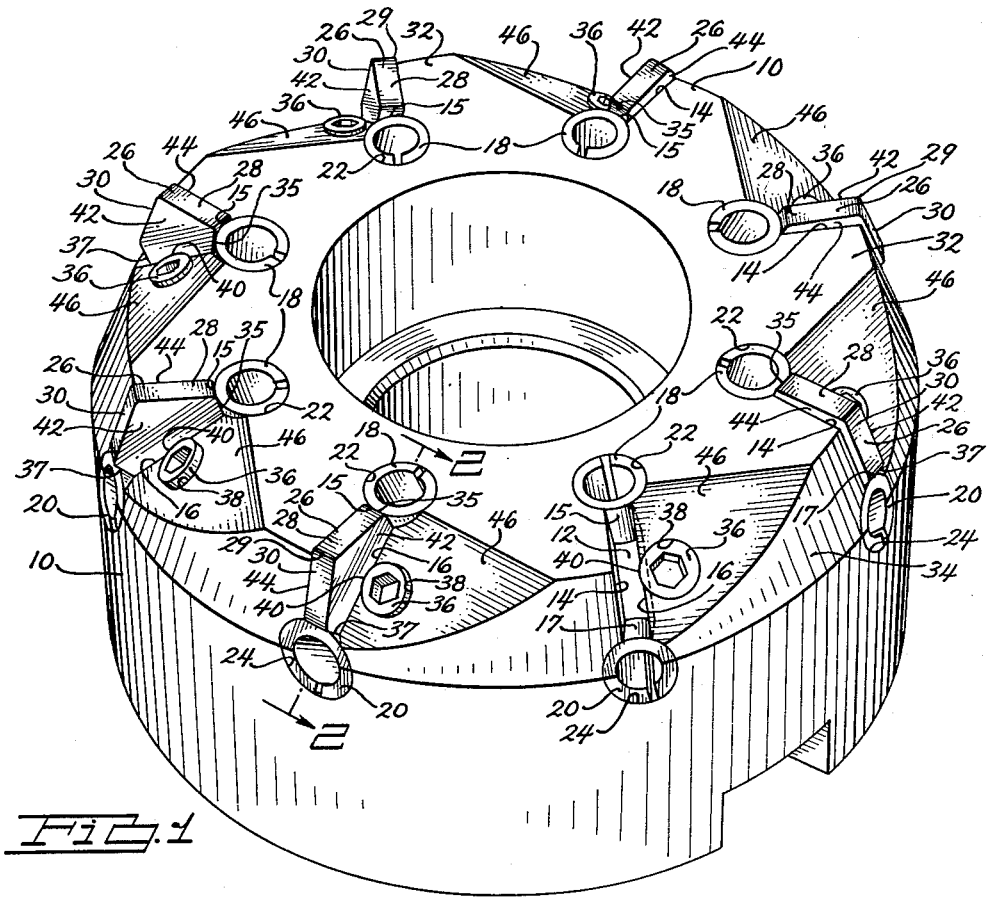
Fig. 1
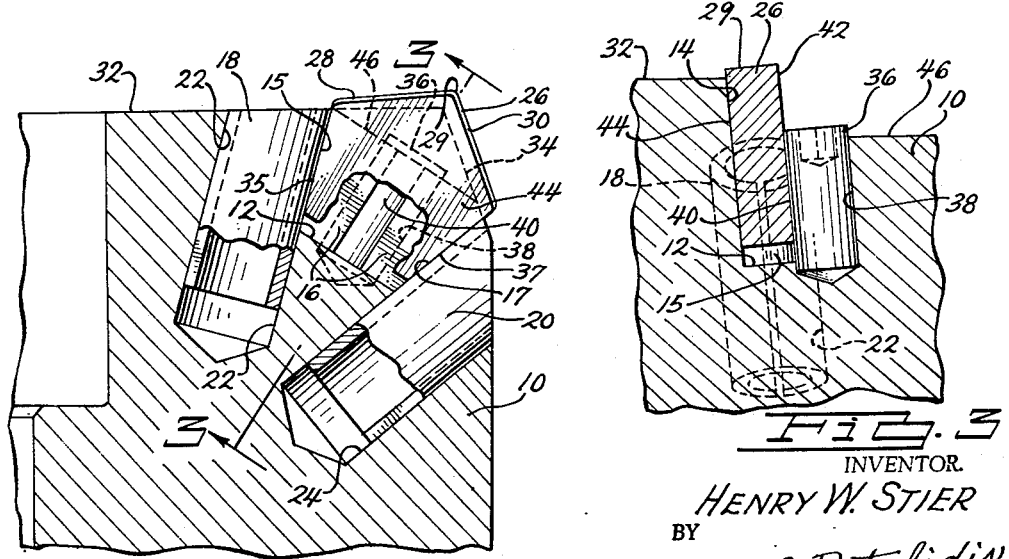
Fig. 2
Fig. 3
INVENTOR.
HENRY W. STIER
BY
Bower & Patalidis
ATTORNEYS Jan. 5, 1965 H. W. STIER 3,163,920
MILLING CUTTER WITH THROWAWAY CUTTING INSERTS
Filed March 18, 1964 2 Sheets-Sheet 2
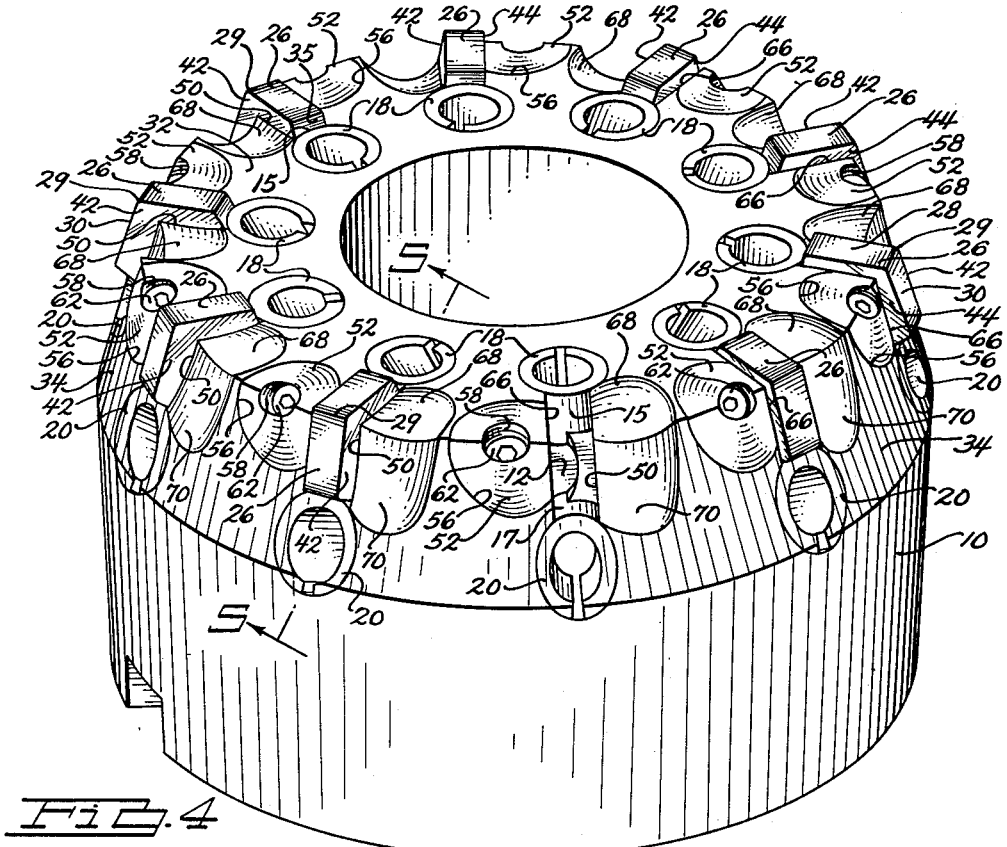
Fig. 4
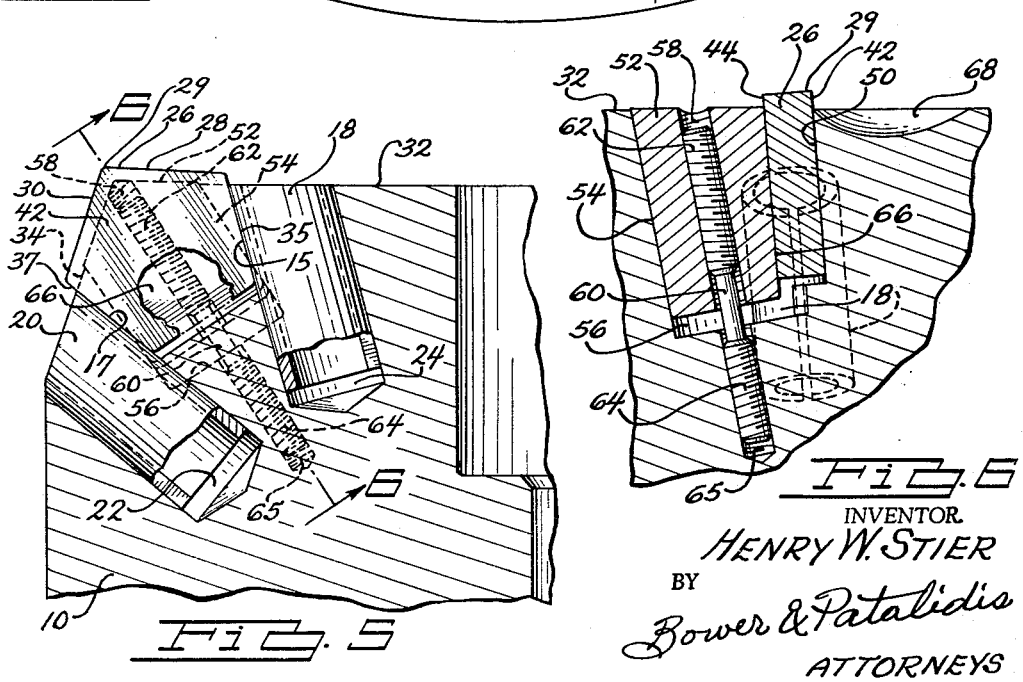
Fig. 5
Fig. 6
INVENTOR.
HENRY W. STIER
BY
Bower & Patalidis
ATTORNEYS

United States Patent Office 3,163,920
Patented Jan. 5, 1965

3,163,920
MILLING CUTTER WITH THROWAWAY
CUTTING INSERTS
Henry W. Stier, Dearborn Heights, Mich., assignor to
Willeys's Carbide Tool Company, Detroit, Mich.
Filed Mar. 18, 1964, Ser. No. 352,857
4 Claims. (Cl. 29—105)

This invention relates to milling cutters of the inserted tooth type provided with removable indexable cutting inserts made of hard material such as tungsten carbides and the like. More particularly, the invention relates to milling cutters having indexable, removable and disposable throwaway cutting inserts which are positively and precisely positioned in slotted sockets or pockets in a disc shaped rotatable body member mounted on the spindle of a milling machine.

The body member of milling cutters according to the present invention is provided with means for securedly holding the cutting inserts in position during machining, such as face milling, of a workpiece, said means being arranged in such a way as to release at will any of the cutting inserts for indexing so as to present fresh cutting edges to the workpiece, or for replacement by a new cutting insert when all the cutting edges of an insert are worn or the insert has become damaged or broken.

An object of the invention, consequently, is to provide an improved milling cutter of the inserted tooth type, and particularly to provide a milling cutter having cutting inserts easily replaceable when worn or broken.

The cutting inserts of a milling cutter according to the invention are positively and precisely held in position in slotted sockets or pockets, with two side faces of each insert abutting against angled pins, or the like, inserted in precisely bored holes in the cutter rotatable body member, the said pins defining the end walls of each slotted socket or pocket. The end walls of the pocket determining in turn the distance at which each cutting insert protrudes from the end and from the side of the cutter body member, precision in defining the position of the end walls results in precision in positioning the cutting inserts so that no adjustment or grinding of the insert cutting faces and edges is required after the milling cutter has been manufactured, or after cutting inserts are indexed to fresh cutting edges or altogether discarded and replaced by new ones. This result is due to the great precision at which holes may be drilled and reamed on modern machine tools, coupled with the great precision and the close tolerances with which cutting inserts made of tungsten carbides, other carbides, and the like, are today manufactured.

Another object of the invention is therefore to provide an improved milling cutter which is substantially easy to manufacture and which afford great precision in the position of the inserted teeth or cutting inserts without resorting to elaborate machining set-ups to obtain accurately positioned and dimensioned slotted sockets or pockets holding the cutting inserts.

These objects and further objects and advantages will be apparent from the following description and claims considered with the accompanying drawings wherein like numerals refer to like or equivalent elements and in which:

FIG. 1 represents a perspective view of an example of a milling cutter which incorporates the present invention, with one cutting insert removed to help to explain an important structural detail thereof;

FIG. 2 is a sectional view of a portion of the milling cutter of FIG. 1, taken substantially on line 2—2 of FIG. 1;

FIG. 3 is a sectional view of a portion of the cutter of FIGS. 1–2, taken substantially along line 3—3 of FIG. 2;

FIG. 4 is a perspective view of another example of a milling cutter which also incorporates the present invention, shown also with one cutting insert removed;

FIG. 5 is a sectional view of a portion of the milling cutter of FIG. 4, taken substantially along line 5—5 of FIG. 4; and FIG. 6 is a sectional view of a portion of the milling cutter of FIGS. 4–5, taken along line 6—6 of FIG. 5.

Referring to the drawings, and more particularly to FIGS. 1–3 thereof, a milling cutter according to the invention comprises a generally disc shaped rotatable body member 10 provided with a plurality of substantially radial slotted sockets or pockets 12 generally disposed preferably at an acute angle to a true radius of the rotatable body member so that the end of the pockets towards the center of the body member leads upon the end closest to the periphery thereof.

Each pocket 12 has two substantially parallel side walls 14 and 16 and two end walls 15 and 17 defined by a portion of the outer surface of cylindrical pins 18 and 20 press fitted in angularly disposed bores 22 and 24 drilled in the body member 10. The angle at which the bores 22 and 24 have been drilled depends from the geometric shape of a carbide, or the like, cutting insert 26 normally disposed in each pocket 12 in such a way that two angularly disposed consecutive cutting edges 28 and 30 thereof are exposed at the end 32 and at the side 34 of the body member 10. In the example of the invention herein illustrated, the cutting insert 26 is pentagon-shaped, and consequently the axes of bores 22 and 24 and of pins 18 and 20 are at a 36° angle. Face 28 of the cutting insert 26 projects a short distance from the end 32 of the body member 12 and is disposed in such a way as to preferably be at a small angle, of the order of 2 to 4 degrees as shown, when seen radially; in other words, the cutting insert is preferably inclined in relation to the plane of end 32 of the body member 12 so that the end of the insert face 28 closest to the peripheral tip projects more than the end of the insert face 28 closest to the center of the body member.

It is apparent that in the milling cutter of FIGS. 1–3 which is designed for facing a workpiece in a plane at right angle with the axis of rotation of the body member by being rotated in a counterclockwise direction, the pockets 12 are disposed at a slight angle in relation to the longitudinal axis of the body member so that the cutting inserts 26 are placed at a negative cutting angle of the order of preferably about 5°. Also, as hereinbefore mentioned, the pockets 12, although generally radially disposed relatively to the body member 12, are preferably inclined at an angle of a few degrees in relation to a true radius of the body member, in such a way that the end of the cutting edge corresponding to face 28 of the cutting insert closer to the center of the body member is ahead of the end of the cutting edge disposed close to the periphery of the body member. This angle may be, for example, 8°, resulting in the side face 30 of the cutting insert being also disposed at a negative cutting angle.

The pockets 12 are made in the body member 10 in the following manner:

Bores 22 and 24 are drilled and reamed with accuracy as to location, angularity and diameter by means of a precision drilling, boring or jig boring machine. The material between the angled bores 22 and 24 is subsequently removed to an appropriate depth and width by, for example, a milling operation, so as to define the pockets 12 and the pocket walls 14 and 16. Pins 18 and 20 are then pressed into the bores 22 and 24, respectively. The pins 18 and 20 may be roll pins, as herein illustrated, or ordinary dowel pins. The ends of the pins are then machined flush with the surfaces of the end 32 and the side 34 of the body member 10.

When the cutting inserts 26 are disposed in the pockets 12 with two faces 35 and 37 abutting against the arcuate end walls of the pockets defined by the portions 15 and 17, respectively, of the outer surface of the pins 18 and 20, the positions, inclinations, cutting, lead and rake angles of the cutting inserts are thus precisely determined.

In the embodiment of the milling cutter of FIGS. 1–3, each cutting insert 26 is securely held in position in its appropriate pocket 12 by means of an eccentric wedge member 36 disposed in a bore 38 parallel to the pocket. The bore 38 opens through the wall 16 of the pocket so as to permit an eccentric camming portion 40 of the eccentric wedge member 36 to protrude through the wall for engaging the face 42 of the cutting insert, thus causing the face 44 of the insert to press against wall 14 of the pocket. This camming action locks the insert 26 in position when the wedge member is rotated to a predetermined position, the protruding camming portion 40 of the wedge member 36 being retracted away from the face 42 of the cutting insert when the eccentric wedge member is rotated in an opposite direction so as to release the cutting insert 26 to allow indexing of new cutting edges or replacement by a new insert.

Oblique cut-out portions, or relief surfaces 46, are disposed across the end 32 and side 34 of the body member 10 so as to provide clearance for the chips removed from a workpiece during a face milling operation by means of the milling cutter of the invention.

The milling cutter of FIGS. 4–6 is substantially similar to the milling cutter of FIGS. 1–3. The most important structural difference between the two embodiments is in the means provided for holding the cutting inserts 26 in the pockets 12. In the example of FIGS. 4–6, each pocket 12 is provided with a solid side wall 50, and an adjustable wedging member 52 comprising a generally cylindrical body 54, is disposed in an appropriate cavity 56 in the milling cutter body member 10. The body 54 of the wedging member 52 is provided with a threaded bore 58 in which engages a threaded member 60 which is provided with a first threaded portion 62 having a thread in one direction and a second threaded portion 64 having a thread in an opposite direction, so that rotation of the threaded member 60 in one direction drives the cylindrical body 54 into the cavity 56. The cylindrical body 54 is provided with an angled flat outer surface 66 defining the wall of the pocket 12 opposed to the side wall 50. It can thus be seen that by rotating the threaded member 60 in one direction locks the insert 26 securely in position in its pocket due to the wedging action of the wedging member 52, and rotating the threaded member 60 in an opposite direction releases the cutting insert 26.

Hollow concave shallow recesses 68 and 70 are provided on the end 32 and the side 34, respectively, of the body member 10 to afford a clearance for the chips removed from a workpiece by the cutting edges of each cutting insert during a face milling operation.

It is evident from the foregoing description that, although the invention has been described as applied to a milling cutter appropriate for face milling of a workpiece, the principle of the invention may be applied to any type of milling tool utilizing hard metal removable indexable polygonal wafer-like inserted teeth or cutting inserts, and various modification of structures and applications will occur to those skilled in the art, without departing from the spirit and scope of the invention as defined in the appended claims.

Having thus described the invention, what is claimed as new and desired to be protected by United States Letters Patent is:

1. A rotary cutting tool of the inserted tooth type comprising a rotatable body member having at least one pocket opening through the side and one end thereof, said pocket having two substantially parallel planar side walls disposed substantially along a radius of said body member and two arcuate end walls defined by the outer surface of cylindrical pins pressed in bores in said body member disposed at a predetermined angle, a cutting insert snuggly disposed within said pocket and having angularly disposed consecutive sides providing cutting edges exposed at the side and at the end of said body member and two other sides abutting against said cylindrical pins, and means for clamping said cutting insert in said pocket.

2. A rotary cutting tool of the inserted tooth type comprising a rotatable body member having at least one pocket opening through the side and one end thereof, said pocket having two substantially parallel planar side walls disposed substantially along a radius of said body member and two arcuate end walls defined by the outer surface of cylindrical pins pressed in bores in said body member disposed at a predetermined angle, a cutting insert snuggly disposed within said pocket and having angularly disposed consecutive sides providing cutting edges exposed at the side and at the end of said body member and two other sides abutting against said cylindrical pins, and an eccentric wedge member disposed in a bore parallel to and an opening through a first side wall of said pocket, said eccentric wedge member being adapted to be rotatable to a first position whereby said cutting insert is loose in said pocket to a second position whereby said cutting insert is secured in said pocket by being clamped against the second side wall of said pocket by the action of the wedging portion of said eccentric wedge member projecting through said first side wall of said pocket.

3. A rotary cutting tool of the inserted tooth type comprising a rotatable body member having at least one pocket through the side and one end thereof, said pocket having two substantially parallel planar side walls disposed substantially along a radius of said body member and two arcuate end walls defined by the outer surface of cylindrical pins pressed in bores in said body member disposed at a predetermined angle, a cutting insert snuggly disposed within said pocket and having angularly disposed consecutive sides providing cutting edges exposed at the side and at the end of said body member and two other sides abutting against said cylindrical pins, a wedge member having a planar surface forming a portion of one of the side walls of said pocket and adapted to fit in a cavity in said body member proximate to said pocket, and means for driving said wedge member into said cavity so as to exert pressure on a face of said cutting insert whereby said cutting insert is securely clamped in said pocket between said planar surface and the other of said side walls of said pocket.

4. A rotary cutting tool of the inserted tooth type comprising a rotatable body member having at least one pocket opening through the side and one end thereof, said pocket having two substantially parallel side walls disposed substantially along a radius of said body member and two end walls defined by cylindrical pins pressed in bores in said body member disposed at a predetermined angle, a cutting insert snuggly disposed within said pocket and having angularly disposed cutting edges exposed at the side and at the end of said body member and two sides abutting against said cylindrical pins, and means for holding said cutting insert in said pocket.

No references cited.